(12) United States Patent
Linzer

(10) Patent No.: US 10,044,940 B1
(45) Date of Patent: *Aug. 7, 2018

(54) PICTURE BRIGHTNESS ADJUSTED MOTION DETECTION

(71) Applicant: Ambarella, Inc., Santa Clara, CA (US)

(72) Inventor: Elliot N. Linzer, Bergenfield, NY (US)

(73) Assignee: Ambarella, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/725,647

(22) Filed: Oct. 5, 2017

Related U.S. Application Data

(63) Continuation of application No. 14/732,968, filed on Jun. 8, 2015, now Pat. No. 9,813,630.

(51) Int. Cl.
*H04N 5/14* (2006.01)
*G06K 9/46* (2006.01)
*H04N 5/235* (2006.01)
*H04N 5/202* (2006.01)
*H04N 9/69* (2006.01)
*H04N 9/77* (2006.01)

(52) U.S. Cl.
CPC ........... *H04N 5/235* (2013.01); *G06K 9/4652* (2013.01); *H04N 5/144* (2013.01); *H04N 5/202* (2013.01); *H04N 5/2351* (2013.01); *H04N 9/69* (2013.01); *H04N 9/77* (2013.01)

(58) Field of Classification Search
None
See application file for complete search history.

(56) References Cited

U.S. PATENT DOCUMENTS

| 2008/0089479 A1 | 4/2008 | Henkel | 378/57 |
| 2008/0123987 A1 | 5/2008 | Shen | 382/255 |
| 2010/0259626 A1 | 10/2010 | Savidge | 348/208.4 |
| 2011/0142290 A1 | 6/2011 | Aida | 382/107 |
| 2011/0234842 A1 | 9/2011 | Ishiga | 348/223.1 |

*Primary Examiner* — Mark T Monk
(74) *Attorney, Agent, or Firm* — Christopher P. Maiorana, PC

(57) ABSTRACT

An apparatus includes an input circuit and a processing circuit. The input circuit may be configured to receive a sequence of pictures. The processing circuit may be configured to (i) generate a change factor based on gain information for a reference picture selected from the sequence of pictures, gain information for a target picture selected from the sequence of pictures, an average pixel value for the reference picture, and an average pixel value for the target picture, (ii) remap data of a selected one of the reference picture and the target picture by calculating pixel values for the selected picture using original pixel values of the selected picture and the change factor, and (iii) perform motion detection between the reference picture and the target picture utilizing (a) the remapped image data of the selected picture and (b) original data of the picture that was not remapped.

20 Claims, 8 Drawing Sheets

PICTURE BRIGHTNESS ADJUSTED MOTION DETECTION

This application relates to U.S. Ser. No. 14/732,968, filed Jun. 8, 2015, which is incorporated by reference in its entirety.

FIELD OF THE INVENTION

The present invention relates to video signal processing generally and, more particularly, to a picture brightness adjusted motion detection.

BACKGROUND OF THE INVENTION

Conventional motion detection can lead to a false positive (i.e., motion detected where there is none) related to picture brightness changes from frame to frame. False positives can occur (i) when there is an abrupt change in lighting, (ii) when an analog or a digital gain is changed on the sensor, and/or (iii) when a digital gain is changed after data has been read from the sensor.

It would be desirable to implement a picture brightness adjusted motion detection.

SUMMARY OF THE INVENTION

The present invention concerns an apparatus including an input circuit configured to receive a sequence of pictures and a processing circuit. The processing circuit may be configured to (i) generate a brightness change factor based on one or more of gain information for a reference picture selected from the sequence of pictures, gain information for a target picture selected from the sequence of pictures, an average pixel value for the reference picture, and an average pixel value for the target picture, (ii) remap image data of a selected one of the reference picture and the target picture by calculating new pixel values for the selected picture using original pixel values of the selected picture and the brightness change factor, and (iii) perform motion detection between the reference picture and the target picture utilizing (a) the remapped image data of the selected one of the reference picture and the target picture and (b) original image data of the picture that was not remapped.

The objects, features and advantages of the present invention include providing picture brightness adjusted motion detection that may (i) measure picture brightness of a frame prior to motion detection, (ii) remap picture data by scaling the picture data, (iii) remap picture data by applying an offset value, (iv) remap picture data by utilizing a lookup table, and/or (v) be implemented in one or more integrated circuits.

BRIEF DESCRIPTION OF THE DRAWINGS

These and other objects, features and advantages of the present invention will be apparent from the following detailed description and the appended claims and drawings in which:

DETAILED DESCRIPTION OF EMBODIMENTS

Figure 1:
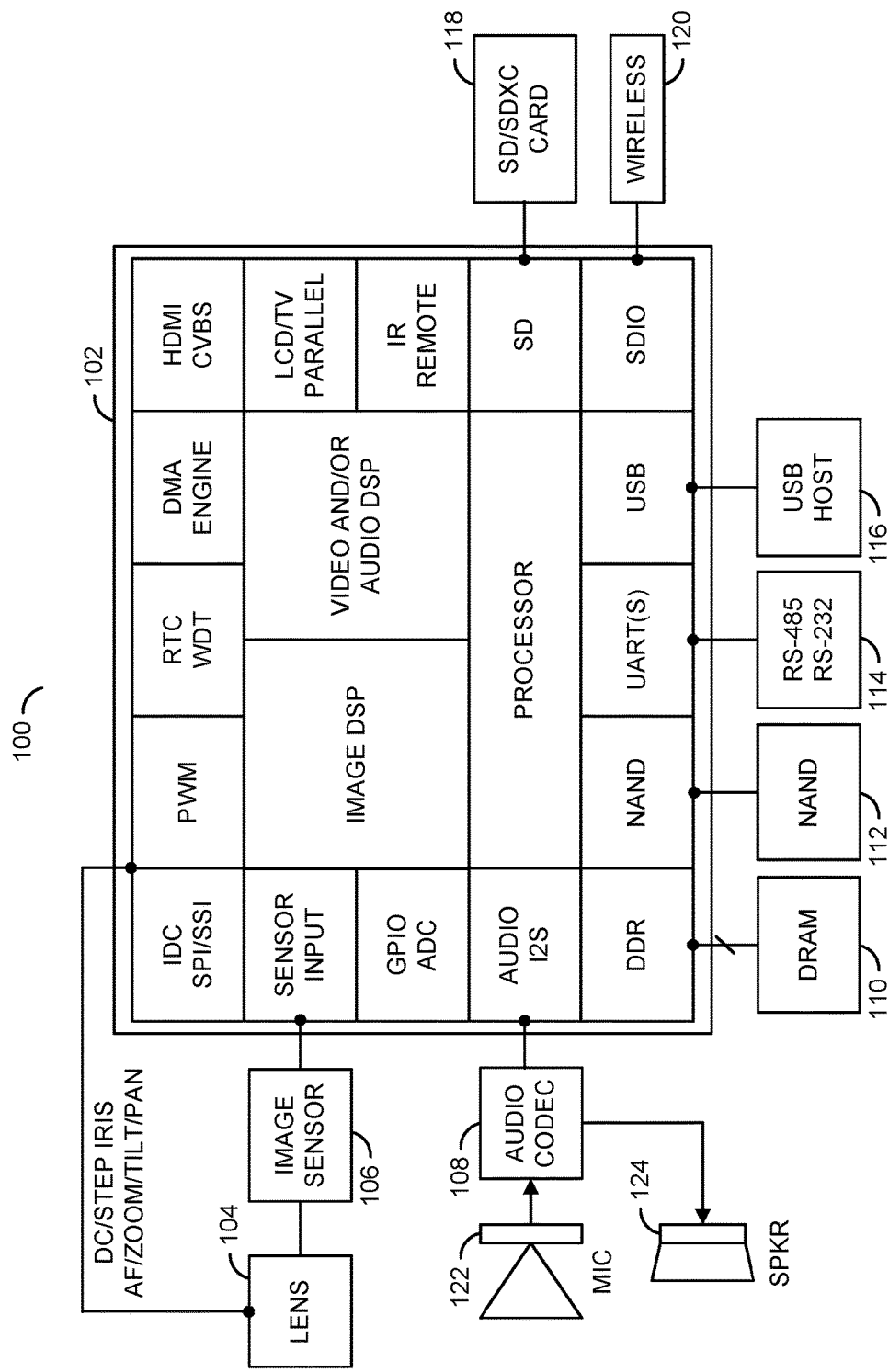
FIG. 1 is a diagram illustrating a video processing system in accordance with an example embodiment of the invention.

Referring to FIG. 1, a block diagram of a camera system 100 is shown illustrating an example implementation of a camera/recorder system (or apparatus). In some embodiments, the camera system 100 may be a digital video camera, a digital still camera, or a hybrid digital video/still camera. In various embodiments, the electronics of the camera system 100 may be implemented as one or more integrated circuits. For example, an application specific integrated circuit (ASIC) or a system-on-a-chip (SOC) may be used to implement a processing portion of the camera system 100.

In various embodiments, the camera system 100 may comprise a camera chip (or circuit) 102, a lens assembly 104, an image sensor 106, an audio codec 108, dynamic random access memory (DRAM) 110, non-volatile memory (e.g., NAND flash memory, etc.) 112, one or more serial interfaces 114, an interface 116 for connecting to or acting as a universal serial bus (e.g., USB) host, an interface for connecting to a removable media 118 (e.g., SD —secure digital media, SDXC—secure digital extended capacity media, etc.), a wireless interface 120 for communicating with a portable user device, a microphone 122 for recording audio, and a speaker 124 for playing audio. In some embodiments, the lens assembly 104 and the image sensor 106 may be part of a separate camera connected to the processing portion of the system 100 (e.g., via a video cable, a high definition media interface (e.g., HDMI) cable, a USB cable, an ethernet cable, or wireless link).

In various embodiments, the circuit 102 may comprise a number of modules (or circuits) including, but not limited to, a pulse width modulation (e.g., PWM) module, a real time clock and watchdog timer (RTC/WDT), a direct memory access (DMA) engine, a high-definition multimedia interface (e.g., HDMI), an LCD/TV/Parallel interface, a general purpose input/output interface (e.g., GPIO) and analog-to-digital converter (e.g., ADC) module, an infrared (IR) remote interface, a secure digital input output interface (e.g., SDIO) module, a secure digital (e.g., SD) card interface, an audio $I^2S$ interface, an image sensor input interface, and a synchronous data communications interface (e.g., IDC SPI/SSI). The circuit 102 may also include an embedded processor (e.g., ARM, etc.), an image digital signal processor (DSP), and a video and/or audio DSP. In embodiments incorporating the lens assembly 104 and image sensor 106 in the system 100, the circuit 102 may be configured (e.g., programmed) to control the lens assembly 104 and receive image data from the sensor 106. The wireless interface 120 may include support for wireless communication by one or more wireless protocols such as Bluetooth®, ZigBee®, and/or one or more Institute of Electrical and Electronics Engineering (IEEE) protocol standards (e.g., IEEE 802.11, IEEE 802.15, IEEE 802.15.1, IEEE 802.15.2, IEEE 802.15.3, IEEE 802.15.4, IEEE 802.15.5, IEEE 802.20, etc.). The circuit 102 may also include communication support using one or more universal serial bus (USB) protocols (e.g., 1.0, 2.0, 3.0, etc.). The circuit 102 may also be configured to be powered via the USB connection. However, other communication and/or power interfaces may be implemented accordingly to meet the design criteria of a particular implementation.

In various embodiments, programming code (e.g., executable instructions for controlling various processors of the circuit 102) implementing picture brightness adjusted motion detection in accordance with an embodiment of the invention may be stored in one or more of the memories 110 and 112. When executed by the circuit 102, the programming code generally enables the circuit 102 to capture a sequence of pictures from the sensor 106, determine respective picture brightness values for a pair of pictures (e.g., a reference picture and a target picture) selected from the sequence of pictures, remap image data of either the reference picture or the target picture, and perform a motion detection operation between the reference and the target pictures using the remapped picture data. In various embodiments, the circuit 102 may select the particular picture whose image data is remapped based on a configuration setting, a user input (e.g., a mode control), and/or a predetermined criterion.

Figure 2:
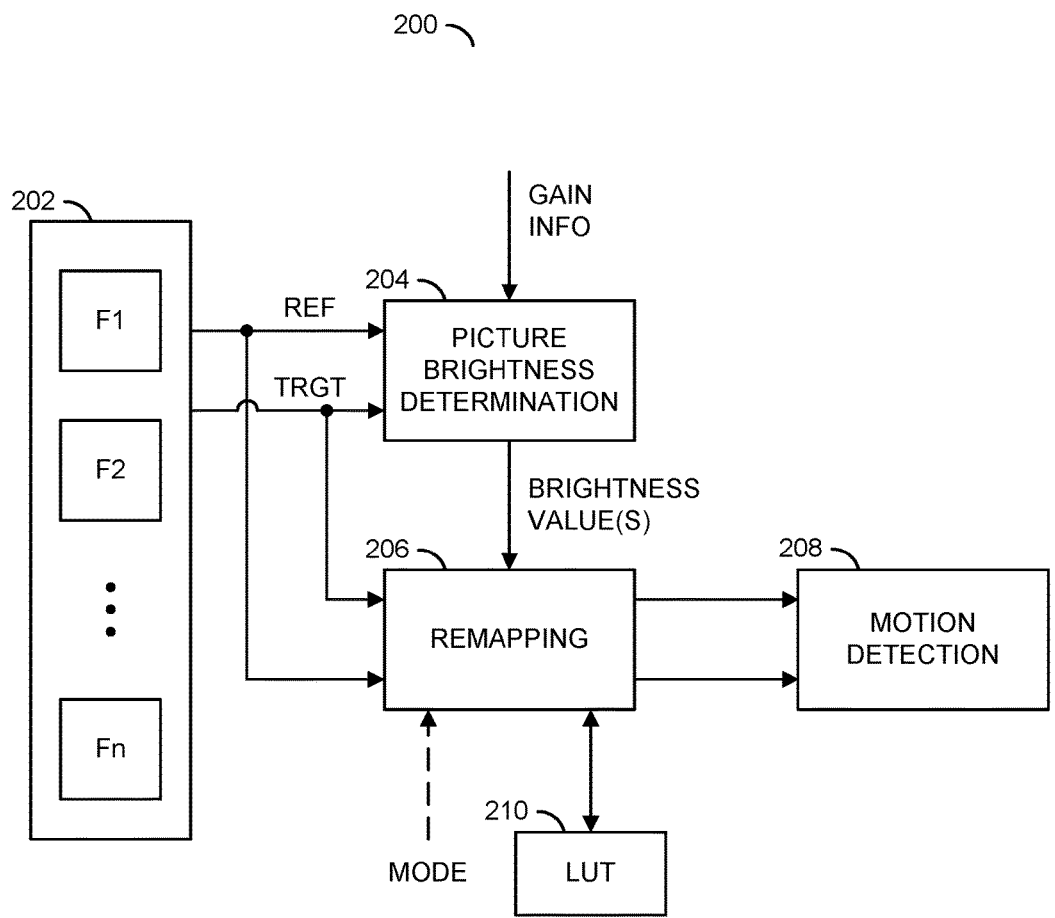
FIG. 2 is a diagram illustrating a picture brightness adjusted motion detection apparatus in accordance with an example embodiment of the invention.

Referring to FIG. 2, a diagram is shown illustrating a picture brightness adjusted motion detection apparatus in accordance with an example embodiment of the invention. In various embodiments, a picture brightness adjusted motion detection apparatus 200 may comprise a block (or circuit) 202, a block (or circuit) 204, a block (or circuit) 206, and a block (or circuit) 208. The block 202 may be configured to receive and store a number or sequence of pictures or frames (e.g., F1, . . . , Fn). The block 204 may be configured to determine picture brightness values for a reference picture (e.g., REF) and a target picture (e.g., TRGT) selected from the pictures stored in the block 202. In various embodiments, the block 204 may determine the picture brightness values based on actual measurements, gain information (e.g., analog, digital, or both analog and digital gains associated with each picture), or any combination thereof.

The block 206 may be configured to remap image data of either the reference picture or the target picture based on the picture brightness values generated in the block 204. The block 206 operating in conjunction with the block 208 generally implements a picture brightness motion detection adjustment technique in accordance with an embodiment of the invention. In some embodiments, the block 206 determines which of the reference and target pictures gets remapped based upon which picture is darker than the other. In some embodiments, the block 206 determines which of the reference and target pictures gets remapped based upon a mode input (e.g., MODE). In some embodiments, the block 206 may be configured to remap the selected image data using a determined multiplier factor. In some embodiments, the block 206 may be configured to remap the selected image data using determined values in a lookup table (e.g., LUT 210). In some embodiments, the LUT 210 is implemented separately from the block 206. In some embodiments, the LUT 210 may be implemented as part of the block 206.

In various embodiments, the block 208 may be configured to perform motion detection between two images received from the block 206, where one image has remapped image data and the other image has the original image data retrieved from the block 202. In some embodiments, the block 208 may be configured to receive only the remapped image data of the adjusted picture from the block 206 and retrieve the original image data of the unadjusted picture from the block 202. In one example, the block 202 may be implemented as part of an input circuit configured to receive a sequence of pictures and the blocks 204-208 may be implemented by a processing circuit configured to manipulate image data using techniques in accordance with the present invention. In some embodiments, the block 202 may comprise or be associated with one or more storage media (e.g., dynamic random access memory (DRAM), static random access memory (SRAM), Flash memory, etc.) configured to store the sequence of pictures. In some embodiments, the sequence of pictures may be stored in an external memory device, and the reference and target pictures brought into a faster internal memory associated with (tightly coupled to) a processor (e.g., DSP, MPU, CPU, etc.) configured to motion compensate the pictures in accordance with an embodiment of the invention.

In various embodiments, picture brightness is used to remap either reference picture data or target picture data prior to motion detection. The motion detection may be performed, but is not limited to, using conventional motion detection techniques. In various embodiments, the picture (or frame) brightness may be determined based on one or more of (i) a known analog gain used on the sensor 106, (ii) a known digital gain used on the sensor 106 or applied after the sensor 106, and (iii) an actual measured picture brightness. In one example, picture brightness may be measured by averaging pixel values received from the sensor 106.

Various techniques may be implemented to remap the image data of either the reference picture or the target picture. In some embodiments, remapping comprises multiplying the image data of the selected picture using an appropriate multiplication factor or multiplier. For example, in an embodiment where the target picture is to be remapped, if the reference picture is determined to be 10% brighter than the target picture, the image data of the target picture may be multiplied by a factor of 1.1. In various embodiments, samples (image data) may be remapped using values in a lookup table. In some embodiments, samples may be remapped using a one-dimensional (1D) lookup table. Embodiments implementing a 1D lookup table may be used for:

1. sum-of-absolute-difference (SAD) on luminance (luma) samples (e.g., using a luma→luma lookup); and
2. SAD on red, green, and blue (RGB) samples (e.g., using R→R, B→B and G→G lookup).

Remapping the samples using the 1D lookup table may provide better performance than multiplying the samples by a multiplier when the samples on which the SAD is being performed are not linearly related to the picture brightness (e.g., when the samples have been gamma corrected).

In some embodiments, a multi-dimensional (nD) lookup table may be used. The multi-dimensional lookup table may be implemented as many-to-1 or many-to-many. Embodiments implementing the multi-dimensional lookup may include, but are not limited to:

1. RGB→RGB lookup, SAD on RGB (many-to-many);
2. YUV→YUV lookup, SAD on YUV (many-to-many); and
3. YUV→Y lookup, SAD on Y (luma) only (many-to-1).

Embodiments implementing the multi-dimensional lookup may perform better than embodiments implementing the 1D lookup when the samples on which the SAD is being performed have undergone a mixture of channels (e.g., color correction).

Various embodiments (or modes) may be implemented with respect to which picture (or frame) is remapped. In a first embodiment (or mode), the reference frame is always remapped. In a second embodiment (or mode), the target frame is always remapped. In a third embodiment (or mode), an adaptive technique may be implemented where the remapped image is selected based upon some criterion (e.g., the darker frame is remapped, etc.). Embodiments implementing the adaptive technique may provide better results when some samples in the brighter frame are at saturation (e.g., equal to a maximum possible value) and cannot be reliably remapped. For example, in a system where the sample values can range from 0 to 255, beyond a certain brightness level all brightness levels will be represented as sample value of 255. If a sample in the brighter frame has a value of 255, the underlying amount of light that the pixel represents could be arbitrarily high. If the frame brightness should be reduced by 10%, there is no way to know how much the remapped value should be lower than 255 or if the remapped value should be lower than 255 at all. In embodiments where multiple modes are available, a signal (e.g., MODE) may be implemented to allow selection of a particular mode to be applied.

Figure 3:
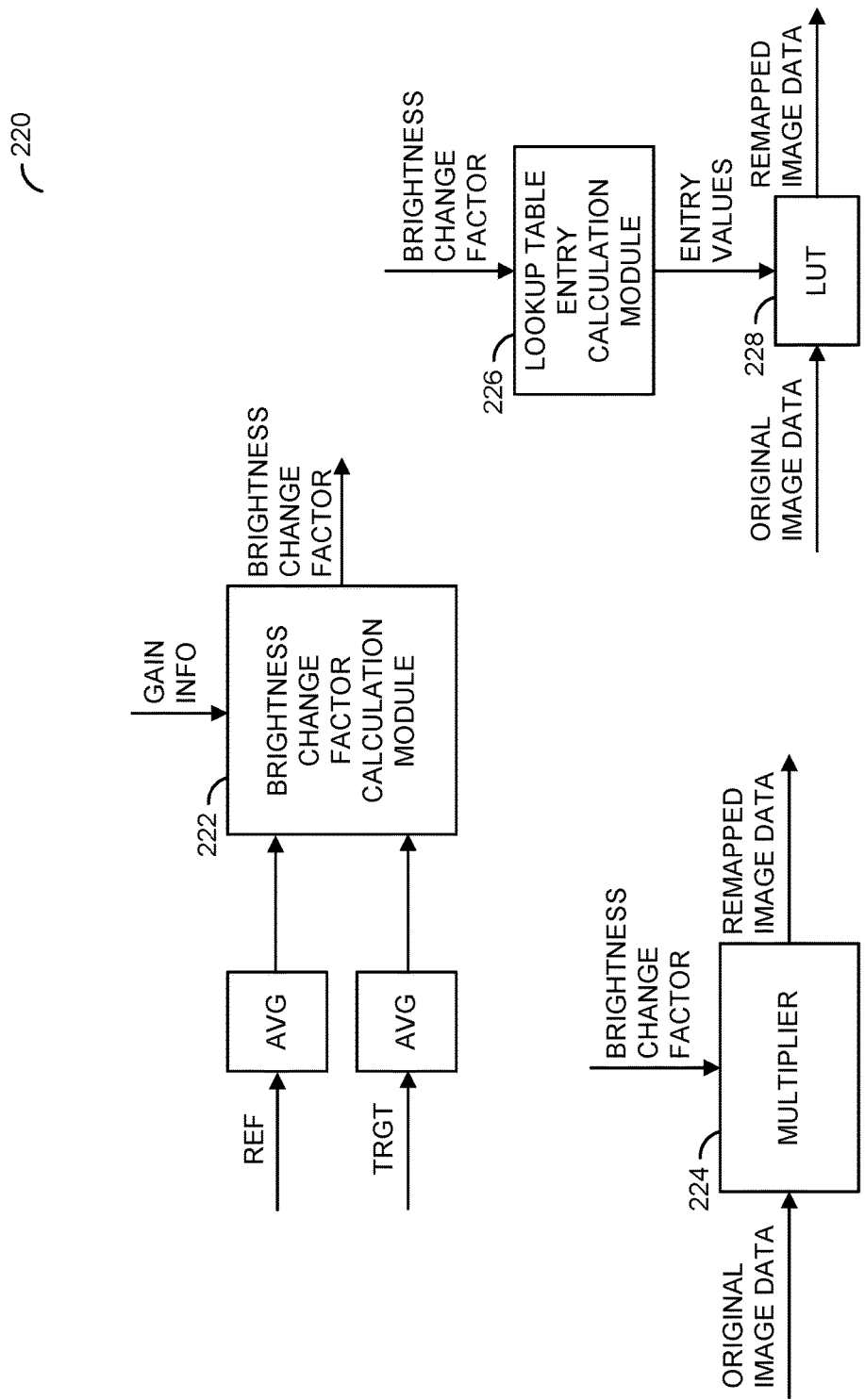
FIG. 3 is a diagram illustrating remapping techniques in accordance with example embodiments of the invention.

Referring to FIG. 3, a diagram is shown illustrating example implementations of remapping apparatus in accordance with embodiments of the invention. In various embodiments, a brightness change factor may be determined, for example, based on gain information and/or average pixel values of the reference and target pictures. In some embodiments, a multiplier circuit may be used to remap image data. A multiplier factor can, for example, be computed based upon the brightness change factor between two pictures. In some embodiments, a lookup table may be generated to remap image data.

In one example, an apparatus (or system or camera) 220 may implement a picture brightness adjusted motion detection process in accordance with an embodiment of the invention. In various embodiments, the apparatus 220 may comprise a block (or circuit) 222, a block (or circuit) 224, a block (or circuit) 226, and a block (or circuit) 228. The block 222 may implement a brightness change factor calculation module. The block 224 may implement a multiplier. The block 226 may implement a lookup table entry calculation module. The block 228 may implement a lookup table. The lookup table 228 may be used as the LUT 210 in FIG. 2.

The block 222 may receive an average pixel value for the reference picture, an average pixel value for the target picture, and gain information (e.g., GAIN INFO) for both the reference and the target pictures. The gain information may include analog and/or digital gain values associated with each the reference picture and the target picture. The block 222 is configured to generate a brightness change factor based on one or more of the gain information for the reference picture, the gain information for the target picture, the average pixel value for the reference picture, and/or the average pixel value for the target picture. The block 224 may be configured to generate remapped image data for the selected picture by multiplying the original image data of the selected picture by the brightness change factor. The block 226 may be configured to calculate entry values for the block 228 based in part upon the brightness change factor. The block 228 may be configured to generate remapped image data for the selected picture in response to the original image data of the selected picture. In one example, the reference picture may use a first gain (e.g., G1 dB) and the target picture may use a second gain (e.g., G2 dB). The first and second gains may be digital, analog, or a combination of digital and analog. If the only difference in brightness is due to a difference in the gains (e.g., G1 does not equal G2), the difference in brightness between the reference and the target pictures may be expressed in terms of the respective gains (e.g., the target picture is $10^{((G2-G1)/20)}$ times brighter than the reference picture). For example, if the reference picture uses a gain of 10 dB and the target picture uses a gain of 11 dB, the target picture is about 1.122 times brighter than the reference picture.

In a second example, if the average pixel value of the target picture is 5% higher than the average pixel value of the reference picture, the target picture may be said to be 1.05 times brighter than the reference picture. The average pixel value is typically measured after an analog gain is applied and before a digital gain is applied. When the average pixel value is measured after application of the analog gain and before application of the digital gain, if average pixel values and gains are used to determine brightness values, then only the digital gain differences need be taken into consideration because any analog gain differences are already accounted for by the averaging of the pixel value measurements.

In a third example, if (i) the average pixel value of the target picture is 5% higher than the average pixel value of the reference picture, (ii) the reference picture uses a digital gain of 10 dB, and (iii) the target picture uses a digital gain of 11 dB, the target picture would be determined to be about 1.178 (e.g., 1.122×1.05 equals approximately 1.178) times brighter than the reference picture.

When the picture brightness differences are compensated for by remapping image data of the reference picture by using a multiplier, then in examples 1, 2, and 3 above the samples in the target picture would be multiplied by 1.122, 1.05, and 1.178, respectively. If the modification of the reference picture is done after gamma (tone) correction and done with a one dimensional lookup table (e.g., the lookup table 244 implemented as a 1D LUT), the lookup table 244 may be programed (e.g., the values of the lookup table entries may be determined) based upon the factor calculated in the block 222 as described below in connection with the examples illustrated in FIGS. 4-6.

Figure 4:
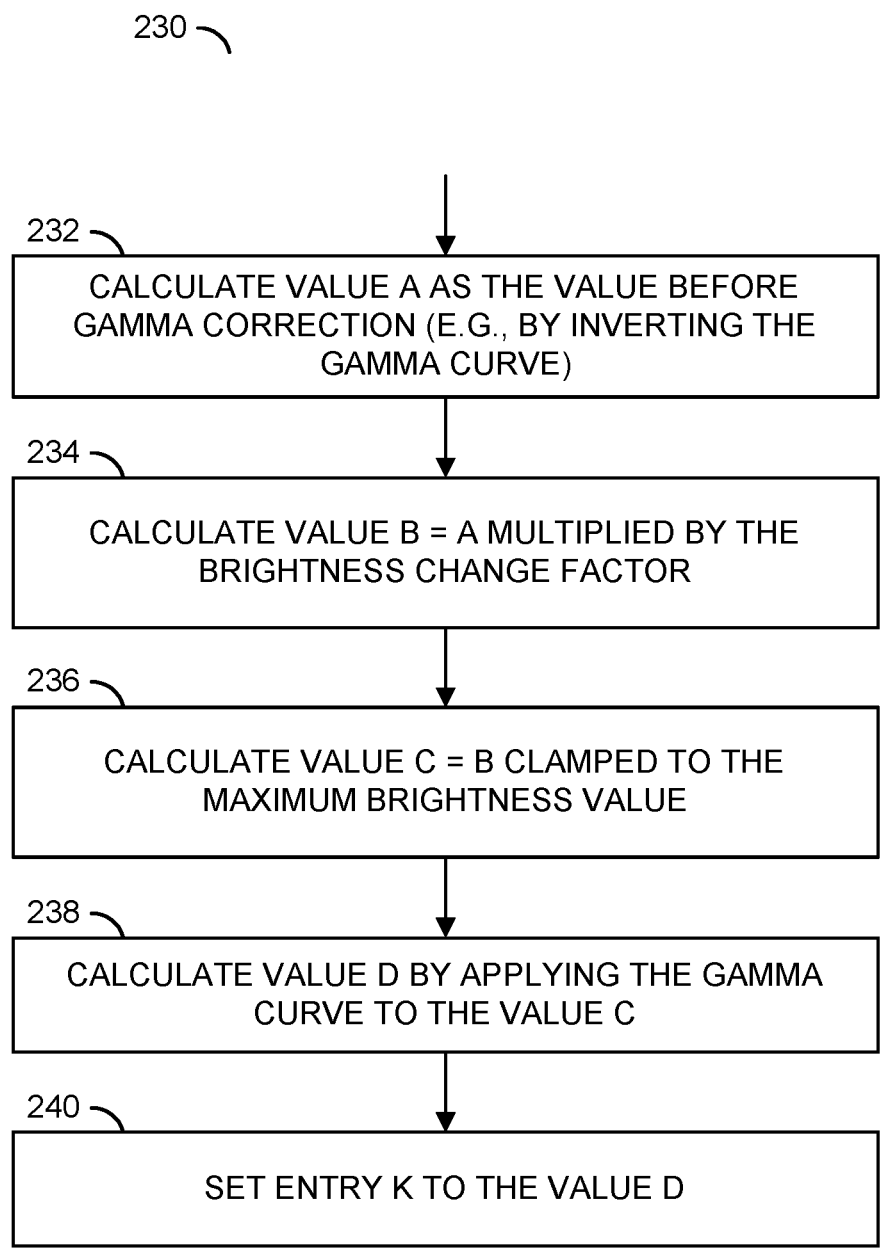
FIG. 4 is a flow diagram illustrating an example of determining values of entries in a lookup table in accordance with an example embodiment of the invention.

Referring to FIG. 4, a flow diagram is shown illustrating a process 230 for determining values of entries in a lookup table in accordance with an example embodiment of the invention. The process (or method) is illustrated for a table with 64 entries (e.g., indices 0-63) and sample values [0,255]. The value of an entry K, where K is in [0,63], may be determined as follows. In a step (or state) 232, for a pixel with K/64 of the maximum value after gamma correction, the process 230 calculates a value A as the pixel value before gamma correction (e.g., by inverting the gamma curve). In a step (or state) 234, the process 230 calculates a value B equal to the value A multiplied by the brightness change factor (e.g., by 1.122, 1.05, and 1.178, respectively, in examples 1, 2, and 3 above). In a step (or state) 236, the process 230 calculates a value C equal to the value B clamped to the maximum brightness value. In a step (or state) 238, the process 230 calculates a value D by applying the gamma curve to the value C. In a step (or state) 240, the process 230 sets the entry K to the value D.

In the above example, the number of table entries (64) is fewer than the number of sample values (256), so when the lookup table is used interpolation is needed. For example, an input sample with a value of 16 would use the entry at index 4, but an input sample with a value of 17 would use three-fourths times the entry at index 4 plus one-fourth times the entry at index 5. In another embodiment, a table with 256 entries may be used to avoid interpolation.

Figure 5:
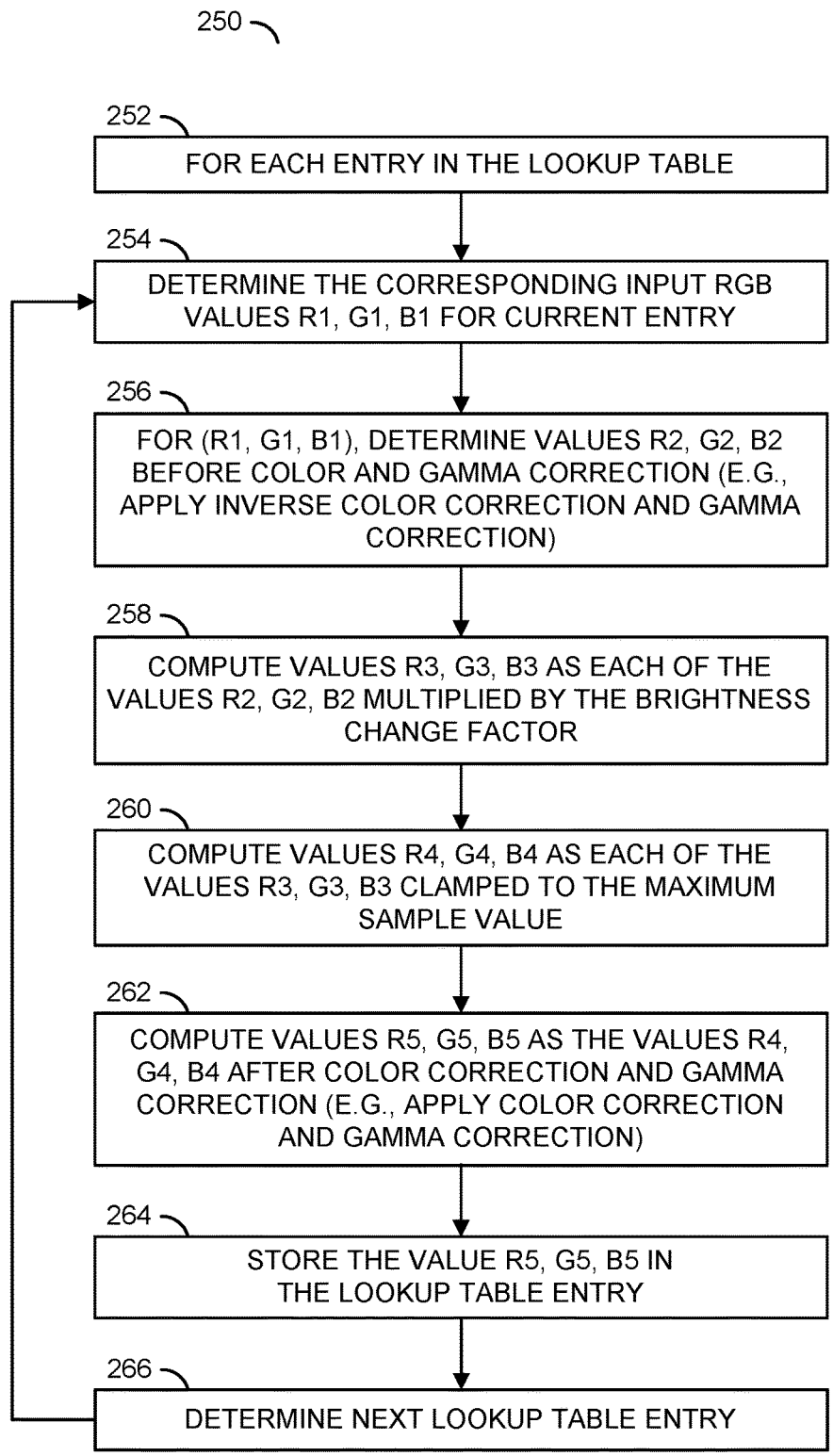
FIG. 5 is a flow diagram illustrating another example of determining values of entries in a lookup table in accordance with an example embodiment of the invention.

Referring to FIG. 5, a flow diagram is shown illustrating a process 250 for determining values of entries in a lookup table in accordance with an example embodiment of the invention. When the modification (remapping) of the image data of the reference picture is done (i) on RGB samples after color correction and gamma (tone) correction and (ii) with a 3D→3D lookup table, the lookup table may be programed, in one example, using the process 250. In a step (or state) 252, the process 250 begins determining values for each entry in the lookup table. In a step 254, the process 250 determines the corresponding input RGB values, R1, G1, B1 for a current entry. In a step (or state) 256, the process 250 determines values R2, G2, B2 corresponding to (R1, G1, B1) before color and gamma correction (e.g., by applying inverse color correction and gamma correction). In a step (or state) 258, the process 250 computes values R3, G3, B3 as each of the values R2, G2, B2 multiplied by the brightness change factor (e.g., by multiplying values R3, G3, B3 by 1.122, 1.05, and 1.178, respectively, from examples 1, 2, and 3 above). In a step (or state) 260, the process 250 computes values R4, G4, B4 as each of the values R3, G3, B3 clamped to the maximum sample value. In a step (or state) 262, the process 250 computes values R5, G5, B5 as the values R4, G4, B4 after color correction and gamma correction (e.g., by applying color correction and gamma correction to the values R4, G4, B4). In a step (or state) 264, the process 250 stores the values R5, G5, B5 in the current lookup table entry. In the step 266, the process 250 moves to the step 254 to determine the next lookup table entry. The process 250 continues until all the entries of the entire lookup table have been determined.

Figure 6:
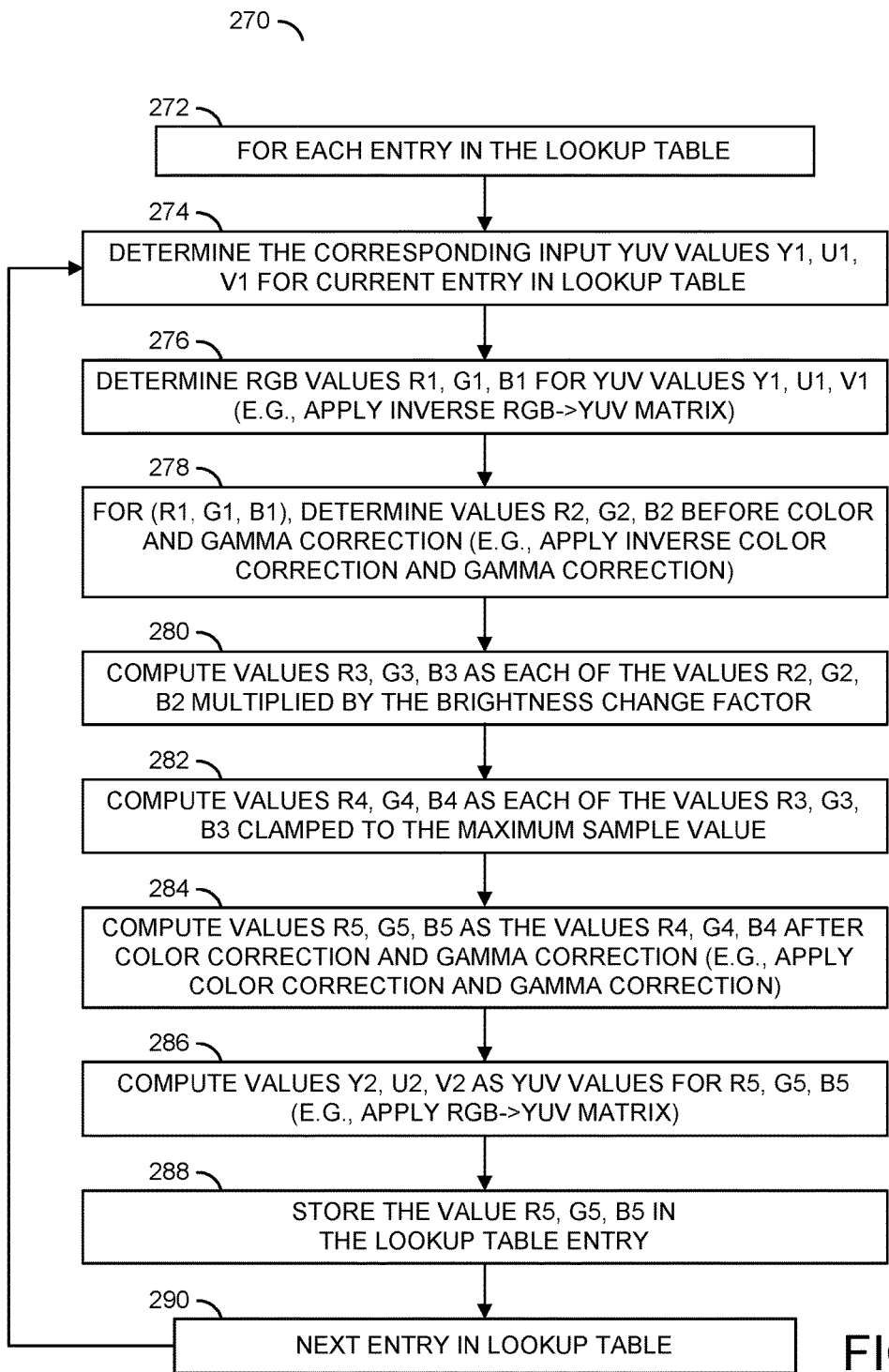
FIG. 6 is a flow diagram illustrating still another example of determining values of entries in a lookup table in accordance with an example embodiment of the invention.

Referring to FIG. 6, a flow diagram is shown illustrating a process 270 for determining the values of entries in a lookup table in accordance with another example embodiment of the invention. If the modification (remapping) of the reference picture is done on YUV samples after color correction and gamma (tone) correction applying an RGB→YUV matrix, and if the modification is done with a 3D→3D (YUV→YUV) lookup table, the lookup table may be programed, for example, using the process 270.

In a step (or state) 272, the process 270 may determine values for each entry in the table. In a step 274, the process 270 may determine the corresponding input YUV values, Y1, U1, V1 for a current lookup table entry. In a step (or state) 276, the process 270 calculates the RGB values R1, G1, B1 for the YUV values Y1, U1, V1 (e.g., by inverting the RGB→YUV matrix). In a step (or state 278, the process 270 determines values R2, G2, B2 corresponding to (R1, G1, B1) before color and gamma correction (e.g., by applying inverse color correction and gamma correction). In a step (or state) 280, the process 270 calculates the values R3, G3, B3 as each of the values R2, G2, B2 multiplied by the brightness change factor (e.g., by multiplying the values R2, G2, B2 by 1.122, 1.05, and 1.178, respectively, in examples 1, 2, and 3 above). In a step (or state) 282, the process 270 calculates the values R4, G4, B4 as each of the values R3, G3, B3 clamped to the maximum sample value. In a step (or state) 284, the process 270 calculates the values R5, G5, B5 as the values R4, G4, B4 after color correction and gamma correction (e.g., by applying color correction and gamma correction to the values R4, G4, B4). In a step 286, the process 270 calculates the values Y2, U2, V2 as the YUV values for R5, G5, B5 (e.g., by applying the RGB→YUV matrix). In a step or (state) 288, the process 270 stores the values Y2, U2, V2 as the lookup table entry. In a step (or state) 290, the process 270 moves to the step 274 to determine the next lookup table entry. The process 270 continues until all the entries of the entire lookup table have been determined.

If the modification (remapping) of the reference picture is done on YUV samples after color correction and gamma (tone) correction applying an RGB→YUV matrix, and if the modification is done with a 3D→1D (YUV→Y) lookup table, the lookup table may be programmed, for example, similarly to the description above, but only Y2, and not U2 and V2, may be computed.

Remapping the reference picture using RGB→RGB, YUV→YUV or YUV→Y lookup tables utilizes a lookup in a 3D table. In one implementation, the 3D table may cover all possible values of the input. Such an implementation could be quite costly. For example, if each input can have 256 values (0-255), then the 3D table would need $256^3=16,777,216$ entries. A more practical implementation may use a smaller table (e.g., 16×16×16 or 32×32×32) and interpolation of the table (for remapping the selected picture). The interpolation of the table may be achieved using conventional techniques such as those disclosed in U.S. Pat. No. 4,275,413.

Figure 7:
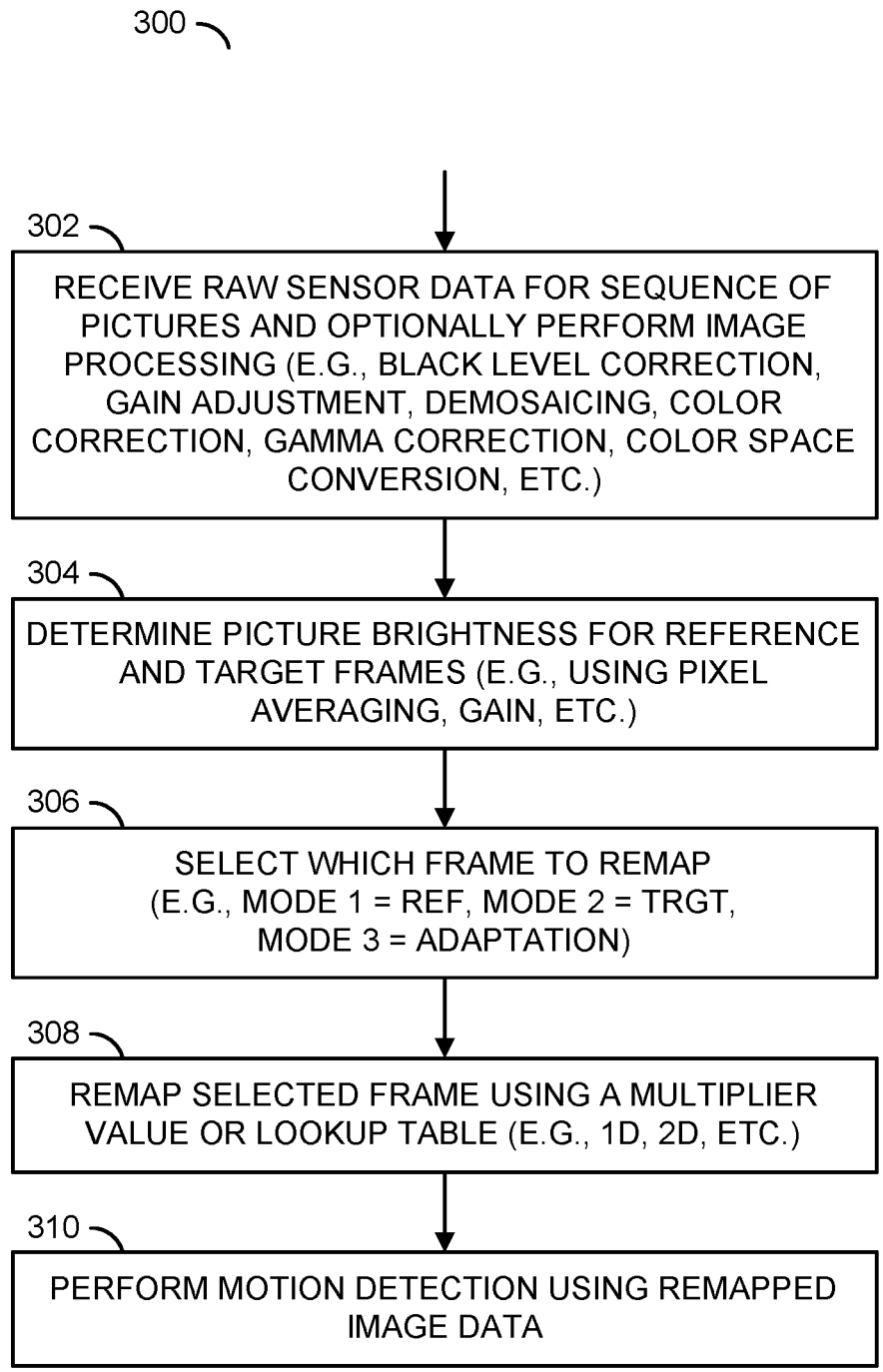
FIG. 7 is a flow diagram illustrating a picture brightness adjusted motion detection process in accordance with an example embodiment of the invention.

Referring to FIG. 7, a flow diagram is shown illustrating a picture brightness adjusted motion detection method 300 in accordance with an example embodiment of the present invention. The method (or process) 300 may be performed by the circuit 102. The method 300 generally comprises a step (or state) 302, a step (or state) 304, a step (or state) 306, a step (or state) 308, and a step (or state) 310. The steps 302-310 may be implemented in an apparatus (or circuit or device) using hardware, software, firmware, or any combination thereof.

In the step 302, the circuit 102 may receive raw sensor data (e.g., from the sensor 106 via the sensor input block). Optional image processing steps (e.g., black level correction, gain (e.g. digital) adjustment, demosaicing, color correction matrix, gamma correction, color space conversion, etc.) may be performed, for example, using the digital signal processing (DSP) blocks of the circuit 102. In the step 304, the circuit 102 may determine picture brightness for each of the reference and the target frames (e.g., REF and TRGT, respectively). In some embodiments, the picture brightness of each frame is determined by actual measurement (e.g., averaging pixel values, etc.). In some embodiments, the picture brightness is determined based on a gain (digital and/or analog) applied to the picture. In still other embodiments, the particular method used to determined picture brightness is configurable. In the step 306, the circuit 102 may select which frame to remap based upon a configuration or mode selection. In various embodiments, the reference frame is remapped when a first mode (e.g., MODE 1) is selected, and the target frame is remapped when a second mode (e.g., MODE 2) is selected. In some embodiments, a third mode (e.g., MODE 3) is implemented allowing adaptive selection of which frame is remapped). In some embodiments, only the third mode is implemented. For example, the circuit 102 adaptively selects which frame to remap based upon determined respective picture brightness values of the reference and target frames (e.g., the darker frame is selected for remapping, etc.). In the step 308, the circuit 102 remaps the data of the selected frame using a predetermined technique (e.g., using a multiplier value, a 1D lookup, a multi-dimensional lookup, etc.). In some embodiments, the particular remapping technique used is configurable. In the step 310, the circuit 102 performs motion detection utilizing the remapped picture data. The motion detection may be performed according to, but not limited to, conventional techniques.

Figure 8:
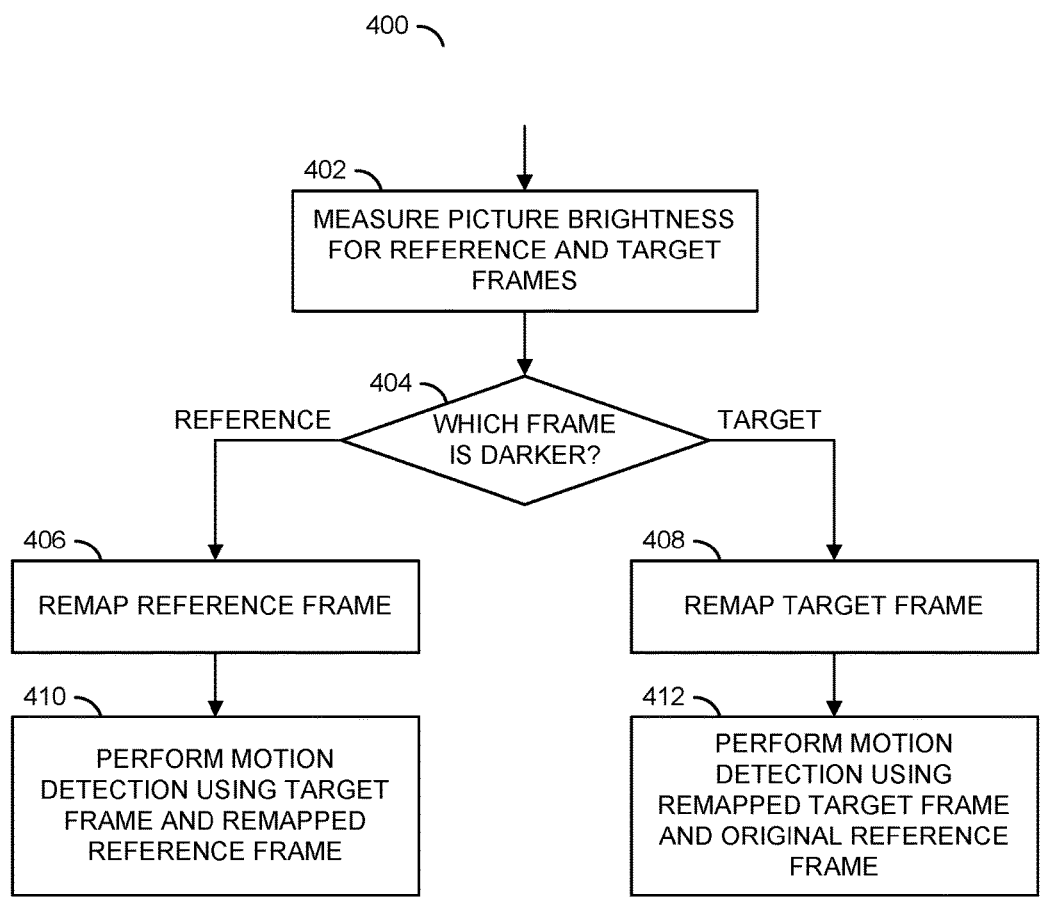
FIG. 8 is a flow diagram illustrating a picture brightness adjusted motion detection process in accordance with another example embodiment of the invention.

Referring to FIG. 8, a flow diagram is shown illustrating a picture brightness adjusted motion detection method 400 in accordance with an example embodiment of the present invention. The method (or process) 400 may be performed by the circuit 102. The method 400 generally comprises a step (or state) 402, a step (or state) 404, a step (or state) 406, a step (or state) 408, a step (or state) 410, and a step (or state) 412. The steps 402-412 may be implemented in an apparatus (or circuit or device) using hardware, software, firmware, or any combination thereof.

In the step 402, the circuit 102 may determine picture brightness for each of the reference and the target frames (e.g., REF and TRGT, respectively). In some embodiments, the picture brightness of each frame is determined by actual measurement. In some embodiments, the picture brightness is determined based on a gain (digital and/or analog) applied to the picture. In still other embodiments, the particular method used to determined picture brightness is configurable. In the step 404, the circuit 102 may select the darker frame to be remapped. When the reference frame is darker than the target frame, the process 400 moves to the step 406. When the reference frame is brighter than the target frame, the process 400 moves to the step 408. In the step 406, the circuit 102 remaps the image data of the reference frame. In the step 408, the circuit 102 remaps the image data of the target frame. The circuit 102 remaps the data of the selected frame using a predetermined technique (e.g., using a multiplier, a 1D lookup, or a multi-dimensional lookup). In some embodiments, the particular remapping technique used is configurable.

When the image data of the reference frame has been remapped in the step 406, the process 400 moves to the step 410. When the image data of the target frame has been remapped in the step 408, the process 400 moves to the step 412. In the step 410, the circuit 102 performs motion detection utilizing the remapped image data of the reference frame and the original data of the target frame. In the step 412, the circuit 102 performs motion detection utilizing the remapped image data of the target frame and the original data of the reference frame.

The functions and structures illustrated in the diagrams of FIGS. 1-8 may be designed, modeled and/or simulated using one or more of a conventional general purpose processor, digital computer, microprocessor, microcontroller and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example a non-transitory storage media, and may be executed by one or more of the processors. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   an input circuit configured to receive a sequence of pictures; and
   a processing circuit configured to (i) generate a brightness change factor based on one or more of gain information for a reference picture selected from said sequence of pictures, gain information for a target picture selected from said sequence of pictures, an average pixel value for said reference picture, and an average pixel value for said target picture, (ii) remap image data of a selected one of said reference picture and said target picture by calculating new pixel values for the selected picture using original pixel values of the selected picture and said brightness change factor, and (iii) perform motion detection between said reference picture and said target picture utilizing the remapped image data of the selected one of said reference picture and said target picture and original image data of the picture that was not remapped.

2. The apparatus according to claim 1, wherein said processing circuit is further configured to select at least one of said reference picture or said target picture to be remapped based upon a first picture brightness value representing an overall brightness of said reference picture and a second picture brightness value representing an overall brightness of said target picture.

3. The apparatus according to claim 2, wherein said processing circuit is further configured to determine the respective picture brightness values using one or both of (i) actual measurements of picture brightness of said reference picture and said target picture and (ii) respective gain or gains applied to each of said reference picture and said target picture.

4. The apparatus according to claim 1, wherein said processing circuit is further configured to remap said image data based on at least one of (i) an average pixel value of each of said reference picture and said target picture, (ii) digital gains applied to each of said reference picture and said target picture, and (iii) analog gains applied to each of said reference picture and said target picture.

5. The apparatus according to claim 1, wherein said processing circuit remaps said image data of whichever picture is darker than the other.

6. The apparatus according to claim 1, wherein said processing circuit is further configured to calculate said new pixel values by:
   determining a multiplier value based on one or more of (i) an actual measured picture brightness of each of said reference picture and said target picture, (ii) an average pixel value of each of said reference picture and said target picture, (iii) digital gains applied to each of said reference picture and said target picture, and (iv) analog gains applied to each of said reference picture and said target picture; and
   multiplying the original pixel values of the selected one of said reference picture and said target picture by said multiplier value.

7. The apparatus according to claim 1, wherein:
   said processing circuit is further configured to remap said image data by using each of said original pixel values as an index into at least one of a one-dimensional lookup table and a multi-dimensional lookup table; and entries in said lookup tables are calculated based on said brightness change factor.

8. The apparatus according to claim 1, wherein said processing circuit is further configured to perform at least one of gamma correction and color correction on said image data prior to remapping.

9. The apparatus according to claim 1, further comprising a storage medium storing said sequence of pictures.

10. The apparatus according to claim 1, wherein said apparatus is fabricated on one or more integrated circuits.

11. A method of performing motion detection comprising:
receiving a sequence of pictures;
generating a brightness change factor based on one or more of gain information for a reference picture selected from said sequence of pictures, gain information for a target picture selected from said sequence of pictures, an average pixel value for said reference picture, and an average pixel value for said target picture;
remapping image data of a selected one of said reference picture and said target picture by calculating new pixel values for the selected picture using original pixel values of the selected picture and said brightness change factor; and
performing said motion detection between said reference picture and said target picture based upon the remapped image data of the selected one of said reference picture and said target picture and original image data of the picture that was not remapped.

12. The method according to claim 11, further comprising:
selecting at least one of said reference picture or said target picture to be remapped based upon a first picture brightness value representing an overall brightness of said reference picture and a second picture brightness value representing an overall brightness of said target picture.

13. The method according to claim 12, wherein the first and the second picture brightness values for the reference picture and the target picture, respectively, are determined using one or both of (i) actual measurements of picture brightness of said reference picture and said target picture and (ii) respective gain or gains applied to each of said reference picture and said target picture.

14. The method according to claim 11, wherein said image data is remapped based on at least one of (i) an average pixel value of each of said reference picture and said target picture, (ii) digital gains applied to each of said reference picture and said target picture, and (iii) analog gains applied to each of said reference picture and said target picture.

15. The method according to claim 11, wherein said image data is remapped based upon which picture is darker than the other.

16. The method according to claim 11, wherein calculating said new pixel values comprises:
determining a multiplier value based on one or more of (i) an actual measured picture brightness of each of said reference picture and said target picture, (ii) an average pixel value of each of said reference picture and said target picture, (iii) digital gains applied to each of said reference picture and said target picture, and (iv) analog gains applied to each of said reference picture and said target picture; and
multiplying the original pixel values of the at least one of said reference picture or said target picture by said multiplier value.

17. The method according to claim 11, wherein:
remapping said image data is performed by using each of said original pixel values as an index into at least one of a one-dimensional lookup table and a multi-dimensional lookup table; and
entries in said lookup tables are calculated based on said brightness change factor.

18. The method according to claim 17, wherein said entries in said lookup tables account for at least one of gamma correction and color correction having been performed on said image data prior to remapping the image data.

19. The method according to claim 17, wherein said entries in said lookup tables account for said original pixel values comprising luminance and chrominance values.

20. The method according to claim 11, further comprising remapping said reference picture in a first processing mode, remapping said target picture in a second processing mode, and selectively choosing between remapping said reference picture or remapping said target picture in a third processing mode.

* * * * *